US011618868B2

(12) United States Patent
Pérez Correa et al.

(10) Patent No.: US 11,618,868 B2
(45) Date of Patent: Apr. 4, 2023

(54) AROMA RECOVERY EQUIPMENT FROM FERMENTATION VATS

(71) Applicants: PONTIFICIA UNIVERSIDAD CATÓLICA DE CHILE, Santiago (CL); SOCIEDAD ANÓNIMA VIÑA SANTA RITA, Santiago (CL); DICTUC S.A, Santiago (CL)

(72) Inventors: José Ricardo Pérez Correa, Santiago (CL); Martín Rodrigo Cárcamo Behrens, Santiago (CL); Camilo Andrés Concha Muñoz, Santiago (CL); Eduardo Andrés Alemparte Benavente, Santiago (CL); José Miguel Benavente Pereira, Santiago (CL); Jorge Alberto Heiremans Bunster, Santiago (CL); Eduardo Esteban Agosín Trumper, Santiago (CL)

(73) Assignees: PONTIFICIA UNIVERSIDAD CATÓLICA DE CHILE, Santiago (CL); SOCIEDAD ANÓNIMA VIÑA SANTA RITA, Santiago (CL); DICTUC S.A, Santiago (CL)

( * ) Notice: Subject to any disclaimer, the term of this patent is extended or adjusted under 35 U.S.C. 154(b) by 946 days.

(21) Appl. No.: 16/475,317

(22) PCT Filed: Dec. 20, 2017

(86) PCT No.: PCT/CL2017/050080
§ 371 (c)(1),
(2) Date: Jul. 1, 2019

(87) PCT Pub. No.: WO2018/119533
PCT Pub. Date: Jul. 5, 2018

(65) Prior Publication Data
US 2019/0330578 A1    Oct. 31, 2019

(30) Foreign Application Priority Data

Dec. 29, 2016  (CL) .................................. 3386-2016

(51) Int. Cl.
*C12F 3/06* (2006.01)
*B01D 5/00* (2006.01)
(Continued)

(52) U.S. Cl.
CPC .............. *C12F 3/06* (2013.01); *B01D 5/0036* (2013.01); *B01D 5/0051* (2013.01); *C12G 1/00* (2013.01); *C12G 3/06* (2013.01); *C12G 2200/21* (2013.01)

(58) Field of Classification Search
CPC ..... C12F 3/04; C12F 3/06; B01D 5/00; B01D 5/0036; B01D 5/0051; B01D 53/265;
(Continued)

(56) References Cited

U.S. PATENT DOCUMENTS

| 4,908,219 | A | * | 3/1990 | Modot | ...................... C12F 3/04 426/11 |
| 5,385,647 | A | | 1/1995 | Brueschke et al. | |

(Continued)

FOREIGN PATENT DOCUMENTS

| DE | 100 18 096 C1 | | 1/2002 | |
| DE | 10018096 C1 | * | 1/2002 | ........... B01D 5/0036 |
| WO | WO-2006024762 A1 | * | 3/2006 | ........... A23B 7/0053 |

OTHER PUBLICATIONS

Lieberman, Norman P.. (2009). Troubleshooting Process Plant Control—5.4 Hot Vapor Bypass Pressure Control, (pp. 37-49). John Wiley & Sons. Retrieved from https://app.knovel.com/hotlink/pdf/id:kt0081H7l1/troubleshooting-process/hot-vapor-bypass-pressure (Year: 2009).*
(Continued)

*Primary Examiner* — Jonathan Miller
*Assistant Examiner* — Gabriel E Gitman
(74) *Attorney, Agent, or Firm* — Ladas & Parry LLP

(57) ABSTRACT

The present invention is a aroma recovery equipment from gases exhausted of fermentation vats comprising a first recovery group (100) comprising a first condenser (110) operating at a first temperature of recovered aromas; one second recovery group (200) comprising a second condenser (210) operating at a second temperature of recovered aromas; a cooling group (300) to provide cold by a cooling fluid (301) to said first recovery group (100) via a first fluid connection (302) and to said second recovery group (200) via a second fluid connection (303); control means (400) configured to coordinately control the temperature of said first recovery group (100) and the temperature of said second recovery group (200); and a mobile housing (500) containing said first recovery group (100), said second recovery group (200), said cooling group (300) and said control means (400).

32 Claims, 2 Drawing Sheets

(51) Int. Cl.
*C12G 1/00* (2019.01)
*C12G 3/06* (2006.01)

(58) Field of Classification Search
CPC ... C12G 1/00; C12G 1/02; C12G 3/06; C12G 2200/21
See application file for complete search history.

(56) References Cited

U.S. PATENT DOCUMENTS

| | | | |
|---|---|---|---|
| 6,117,275 A * | 9/2000 | Baumann | B01D 5/0087 159/901 |
| 2016/0265814 A1 | 9/2016 | Pfister | |
| 2016/0288015 A1 * | 10/2016 | Allen | F28B 7/00 |

OTHER PUBLICATIONS

WO2006024762A1_ENG (Espacenet machine translation of Merican) (Year: 2006).*
DE10018096C1_ENG (Espacenet machine translation of Bach) (Year: 2002).*
S. Yanniotis el al.: Aroma recovery by combining distillation with absorption: Journal of Food Engineering: 78 (2007) 882-887.
Hans O. E. Karlsson et al.: Aroma Recovery During Beverage Processing: Journal of Food Engineering 34 (1997) 159-178.
International Search Report (ISR) for International Application No. PCT/CL2017/050080.
Written Opinion (WO) for International Application No. PCT/CL2017/050080.

* cited by examiner

AROMA RECOVERY EQUIPMENT FROM FERMENTATION VATS

RELATED APPLICATION

This application is a national phase entry under 35 USC 371 of International Patent Application No.: PCT/CL2017/050080 filed on 20 Dec. 2017, which claims priority from Chile Application No. 3386-2016 filed on 29 Dec. 2016, the disclosures of which are incorporated in their entirety by reference herein.

FIELD

The present invention relates to the aromatic industry, for example, the extraction of aroma from exhausted gases from fermentation vats.

BACKGROUND

The recovery of aromas from fermentation gases can be carried out, for example, as described in the patent document U.S. Pat. No. 3,852,477, by passing the fermentation gases through filters with activated carbon, which is subsequently desorbed in particular, in a process of elaboration of enriched wine.

However, the absorption technique for aroma recovery has the disadvantage of a possible saturation of the absorption liquid (Yanniotis et al., 2007). In addition, the absorption liquids require special handling. Other problems associated with this technique are the recovery product contamination and the degradation of aromatic molecules in the process (Karlsson and Trägard, 1997). Therefore, the aromatic recovery using absorption liquids is problematic in the wine industry, and it is contrary to certain laws in some regions of the world (for example, in Chile, where only natural flavorings without additives can be added to wine).

Another technique for the recovery of aromas is disclosed in DE10018096 which describes a device through which fermentation gases are passed comprising 2 or 3 connected condensers in series with temperatures of 0° C. and −20° C. or 0° C., −15° C. and −30° C. respectively. However, some control means or mechanism to avoid freezing in the equipment is not included or described, leaving this technical difficulty in the choice of the design for each condenser.

On the other hand, it has been surprisingly found in the aroma recovery from fermentation vats for wines, that a considerable volume of aroma recovery can be obtained, at even lower temperatures than those used in the prior art, for example, in a process of recovery in 2 condensers operating at 0° C. and −40° C. respectively. For example, a recovery at −40° C. with a volume of condensate corresponding to 75% of the volume recovered at 0° C. (0.8±0.2 mL/L of must) has been observed. A better performance of the aroma recovery is projected as the temperature of the condensers decreases, generating a deeper cold in both stages of recovery, that is, it is sought performing a recovery of aromas with two stages of condensation at temperatures lower than 0° C. and −40° C. respectively.

Technical Problem

In order to be able to perform a high performance of aroma recovery in two stages, an aroma recovery equipment is needed which can effectively prevent freezing problems in the equipment and achieve a temperature lower than 0° C. and −40° C. in both stages of condensation.

Technical Solution

The present invention allows a recovery of aromas in two stages, where the cold generated in both stages is controlled in a coordinated way so that deep cooling is achieved without risk of freezing in the equipment.

SUMMARY

The present invention consists of a aroma recovery equipment from exhausted gases from fermentation vats comprising a first recovery group (100) comprising a first condenser (110) operating at a first temperature of aroma recovering; a second recovery group (200) comprising a second condenser (210) operating at a second temperature of aroma recovering; a cooling group (300) for supplying coolant by means of a cooling fluid (301) to said first recovery group (100) by a first fluid connection (302) and said second recovery group (200) by a second fluid connection (303); control means (410, 420, 430. 440) configured to coordinate the temperature of said first recovery group (100) and the temperature of said second recovery group (200); and a mobile housing containing said first recovery group (100), said second recovery group (200), said cooling group (300) and said control means (420,430 and 440).

Advantages of the Invention

The present invention allows a aroma recovery from fermentation vats, allowing multiple connections for large volumes of fermenting liquids by a compact and mobile equipment, simple of use and great versatility for varying and controlling the conditions of operation and also facilitating their maintenance.

The present invention allows a highly efficient aroma recovery through two condensation stages, achieving a deep cold without risk of freezing in the equipment.

DETAILED DESCRIPTION OF THE INVENTION

Figure 1:
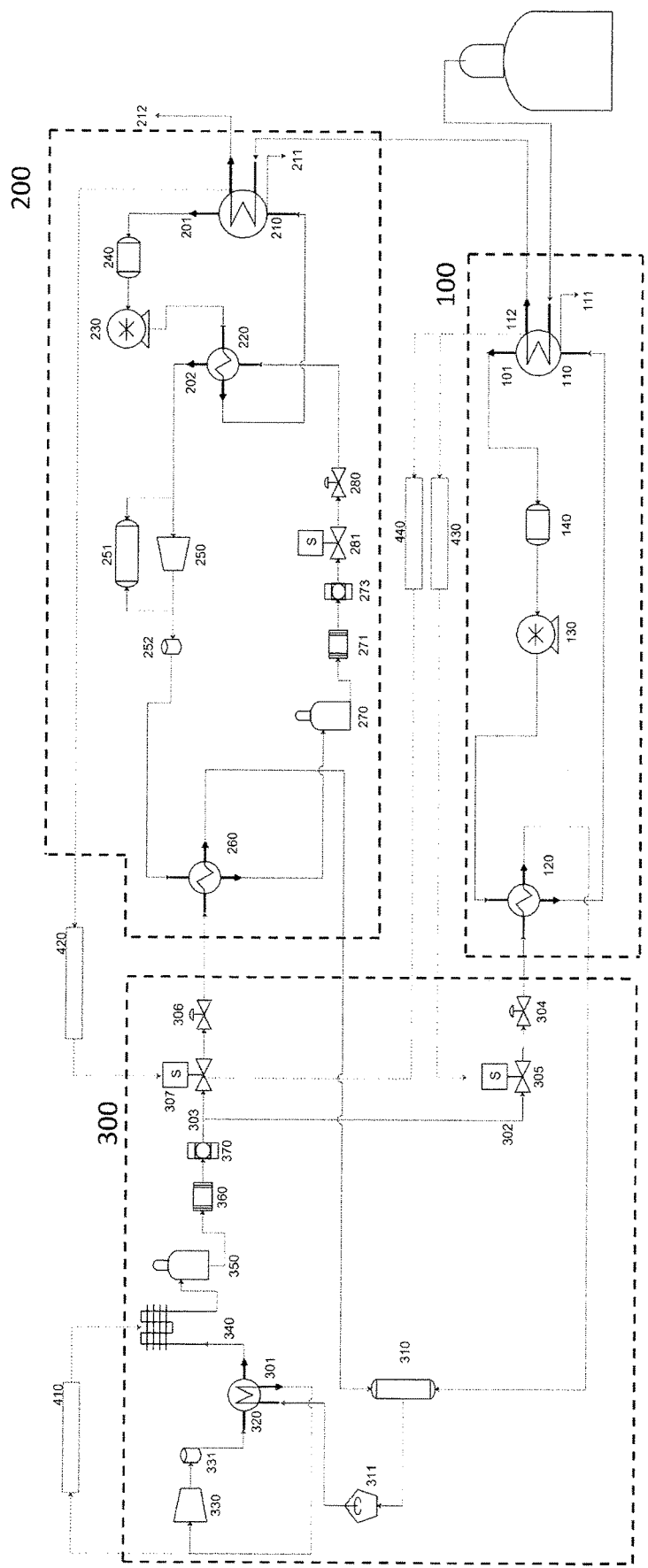
FIG. 1 shows a flowchart of one embodiment of the aroma recovery equipment according to the present invention.
Figure 2:
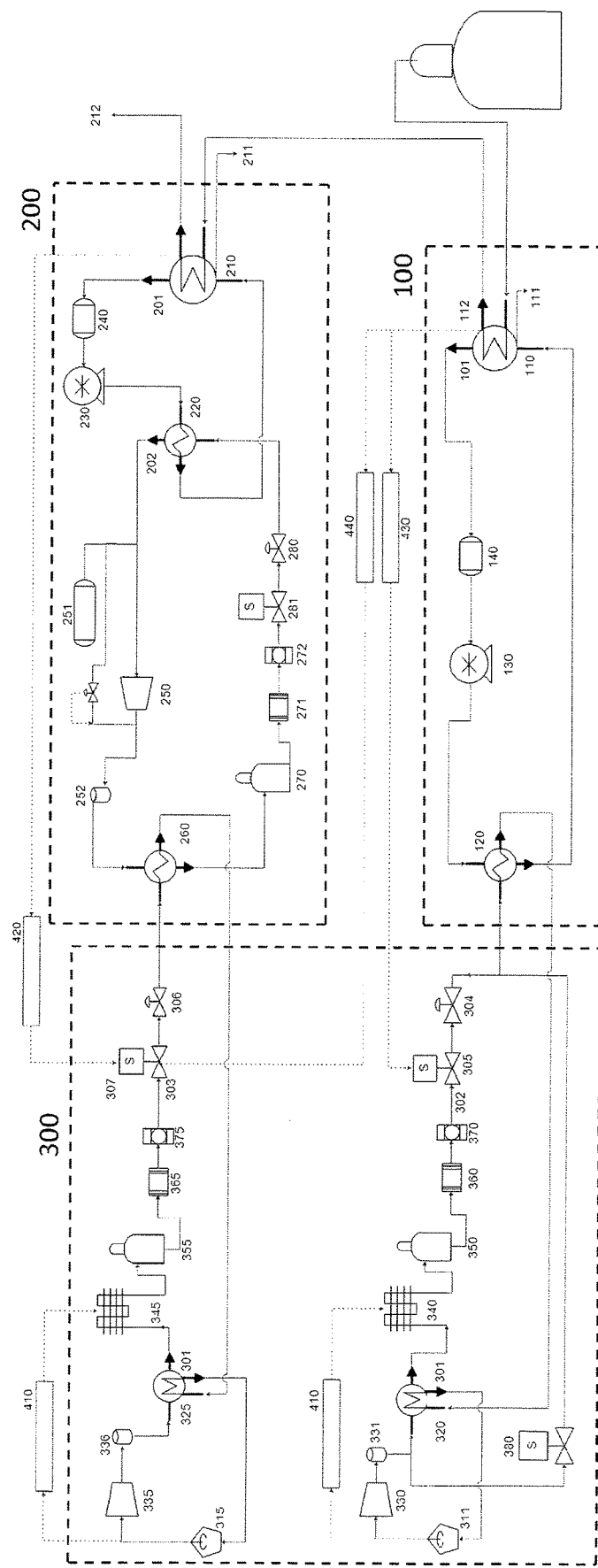
FIG. 2 shows a flowchart of another embodiment of the aroma recovery equipment according to the present invention.

The exemplary and exemplary embodiments of the present invention are described below and with reference to FIGS. 1 and 2, where preferred examples are given for an embodiment of an aroma recovery equipment from exhausted gases from fermentation vats, consisting mainly of $CO_2$ and at a temperature between 10° C. and 30° C.

The present invention consists of aroma recovery equipment from exhausted fermentation vats comprising:

A first recovery group (100) comprising a first condenser (110) operating at a first outlet gas temperature and receiving the exhausted gases from fermentation vats, it condenses the aromas into a liquid recovered through an aroma outlet (111) for being stored, and then it exhausts gases exhausted through a gas outlet (112) of the first recovery group (100);

A second recovery group (200) comprising a second condenser (210) operating at a second outlet gas temperature and receiving the exhaust gases from the exhaust gas (112) of the first recovery group (100), it condenses the aromas into a liquid recovered through a second aroma outlet (211) for being stored, and then it exhausts the exhausted gases through a gas outlet (212) of the recovery equipment;

A cooling group (300) for supplying coolant by means of a cooling fluid (301) to said first recovery group (100) through a first fluid connection (302) and said second recovery group (200) through a second fluid connection (303);

Control means (410, 420, 430, 440) configured to coordinate the temperature of said first recovery group (100) and the temperature of said second recovery group (200); and A mobile housing containing said first recovery group (100), said second recovery group (200), said cooling group (300) and said control means (410, 420, 430, 440).

Preferably, said cooling fluid (301) may be Freon R404 or R507 type (or similar as ammonium, $CO_2$, etc.).

Preferably, said first outlet gas temperature of said first condenser (110) is between 0° C. and −15° C., more preferably about −10° C.

According to one aspect of the invention, said first fluid connection (302) of the cooling group (300) comprises a first expansion valve (304) connected to said first condenser (110) which is a flooded type and is cooled down by the expansion of the cooling fluid (301) in said first condenser (110), wherein said first expansion valve (304) is electronic and controlled by said control means.

Alternatively, said first fluid connection (302) of the cooling group (300) comprises a first control solenoid valve (305) and a first expansion valve (304) connected in series to said first condenser (110) which is a flooded type and is cooled down by expansion of the cooling fluid (301) into said first condenser (110), wherein said first control solenoid valve (305) is controlled by said control means.

Preferably, said first recovery group (100) includes said first condenser (110) connected to a heat exchanger (120) connected to a pump (130) connected to a fluid tank (140) connected to said first condenser (110) forming a first cooling cycle operating with a first cooling fluid (101) withdrawing heat from the first condenser (110).

For example, said first cooling fluid (101) is glycol, propylene glycol or ethanol, said first condenser (110) is a tube and shell type of exchanger, said first heat exchanger (120) is a plate exchanger, said pump (130) is a peripheral pump of 0.5 hp and a flow rate of 20 to 30 L/min., of stainless steel and connected to said tank (140) which is a tank of stainless steel or other inert material, with a capacity up to 5 liters.

For example, said first condenser (110) admits a cold fluid which is at a temperature of −15° C. at its inlet, wherein said cold fluid is said first cooling fluid (101) of the first cooling cycle or said cooling fluid (301) of the cooling group (300).

According to a preferred aspect of the invention, said first fluid connection (302) of the cooling group (300) comprises a first control solenoid valve (305) and a first expansion valve (304) connected in series to the first exchanger (120) of the first recovery group (100), delivering the cooling fluid (301) by expanding in the first heat exchanger (120) to withdraw heat from said first recovery group (100), wherein said first control solenoid valve (305) is controlled by said control means.

Alternatively, said first fluid connection (302) of the cooling group (300) comprises a first expansion valve (304) connected to the first heat exchanger (120) of the first recovery group (100), delivering the cooling fluid (301) expanding into the first heat exchanger (120) to withdraw heat from the first recovery group (100), wherein said first expansion valve (304) is electronic and is controlled by said control means.

Preferably, the expansion valve (304) is a manual valve.

Preferably, said second outlet gas temperature of the second condenser (210) is between −40° C. and −60° C., more preferably about −50° C.

According to one aspect of the invention, the second fluid connection (303) of the cooling group (300) comprises a second expansion valve (306) connected to said second condenser (210) which is a flooded type and is cooled with the expansion of the cooling fluid. (301) in said second chamber (210) wherein said second expansion valve is electronic and controlled by said control means.

Still alternatively, said second fluid connection (303) of the cooling group (300) comprises a second control solenoid valve (307) and a second expansion valve (306) connected in series to said second condenser (210) which is a flooded type and is cooled with the expansion of the cooling fluid (301) into said second condenser (210), wherein said second control solenoid valve (307) is electronic and controlled by said control means.

Preferably, said second recovery group (200) includes said second condenser (210) connected to a second heat exchanger (220) connected to a pump (230) connected to a fluid tank (240) connected to said second condenser (210) forming a second cooling cycle operating with a second cooling fluid (201) withdrawing heat from the second condenser (210).

For example, said second cooling fluid (201) is ethanol or silicone oil of methyl phenyl or similar, and said second condenser (210) is a tube and shell type exchanger, said second heat exchanger (220) is an exchanger, said pump (230) is a stainless steel peripheral pump of 0.5 to 1 hp and a flow rate of 20 to 30 L/min. and connected to said tank (240) which is a stainless steel tank with a capacity of up to 5 liters.

For example, said second condenser (220) admits a cold fluid at a temperature between −45° C. and −60° C. at its inlet, according to a preferred aspect, said cold fluid is at a temperature of −55° C. and more preferably, said fluid is at a temperature of −60° C., wherein said cold fluid is said second cooling fluid (201) of the second cooling cycle or said cooling fluid (301) of the cooling group (300).

According to a preferred aspect of the present invention, said second recovery group (200) further comprises a compressor (250) and an expansion tank (251) in parallel, connected on one side to the second heat exchanger (220) and on the other side to a liquid/oil separator (252) connected to a third heat exchanger (260) connected to a liquid accumulator (270) connected to a dehydrating filter (271) connected to a liquid visor (272) connected to a control solenoid valve (280) connected to an expansion valve (281) connected to said second heat exchanger (220) forming a cascade refrigerant cycle operating with a cascade refrigerant fluid (202) that withdraws heat from the second cooling cycle.

Alternatively, said cascade refrigerant cycle also comprises a pressure relief valve connected in parallel to the compressor (250) and the expansion tank (251) in order to eliminate the excess pressure by releasing the cascade refrigerant fluid (202) into the expansion tank (251).

For example, said cascade refrigerant fluid (202) may be R13, R23, R508 or R744 which can condense at temperatures between −20° C. and −40° C. and evaporate at temperatures around −60° C., in particular, a load of 8 kg can be used; said compressor (250) is hermetic, reciprocating, operated with a power of about 2 hp with an appropriate frequency variator to vary the speed of the compressor (250) as a function of the suction pressure, said expansion tank (251) is a tank with a capacity of about 20 liters, said liquid/oil separator (252) has ⅜" fluid connections with a capacity of 5 kg, said third heat exchanger (260) is a plate exchanger which condenses the cascade refrigerant fluid at a temperature between −20° C. and −40° C., said liquid accumulator (270) with ⅞" fluid connections and a capacity up to 3.9 liters; said dehydrating filter (271) avoids moisture or impurity in the circuit and, for example, has a capacity for ⅝" fluid connection with flare connections for easily and regularly changing; and said liquid visor (272) for inspecting cascade refrigerant fluid (202) of the circuit has ⅝" fluid connection.

Preferably, said second fluid connection (303) of the cooling group (300) comprises a second control solenoid valve (307) and a second expansion valve (306) connected in series to the third heat exchanger (260) of the second group (200). delivering the cooling fluid (301) by expanding into the third heat exchanger (260) to withdraw heat from the cascade refrigerant cycle of the second recovery group (200), wherein said second control solenoid valve (307) is controlled by said control means.

Alternatively, said second fluid connection (303) of the cooling group (300) comprises a second expansion valve (306) connected to the third heat exchanger (260) of the second recovery group (200) which delivers the cooling fluid (301) expanding in the third heat exchanger (260) to withdraw heat from the cascade cooling cycle of the second recovery group (200), wherein said second expansion valve (306) is electronic and is controlled by said control means.

Alternatively, the expansion valve (306) is a manual valve.

According to a preferred aspect of the present invention, said cooling group (300) comprises a pressure modulator (310) connected by a first inlet to the first heat exchanger (120) of the first recovery group (100) and by a second input to the third heat exchanger (260) of the second recovery group (200).

Alternatively, said cooling group (300) comprises a pressure modulator (310) connected by a first inlet to the first heat exchanger (120) of the first recovery group (100) and by a second inlet to the third heat exchanger (260) of the second recovery group (200).

Alternatively, said cooling group (300) comprises a pressure modulator (310) connected by a first inlet to the first heat exchanger (120) of the first recovery group (100) and by a second inlet to the second condenser (210) of the second recovery group (200).

Preferably, said pressure modulator (310) is connected to a first suction trap (311) connected to a fourth heat exchanger (320) connected to a first compressor (330) connected to a first liquid/oil separator (331) connected to said fourth heat exchanger (320) forming a cooling loop that said cooling fluid (301) from the first suction trap (311) withdraws heat from the cooling fluid (301) from the first liquid/oil separator (331).

Preferably, said fourth heat exchanger (320) is connected to a first air cooled condenser (340) connected to a first liquid accumulator (350) connected to a first dehydrating filter (360) connected to a first liquid visor (370) connected, in a first branch, to said first fluid connection (302) forming a first refrigeration cycle of the cooling group (300) which withdraws heat from said first recovery group (100) and, in a second branch, to said second fluid connection (303) forming a second refrigeration cycle of the cooling group (300) which withdraws heat from said second recovery group (200) and in parallel with said first refrigeration cycle.

The pressure modulator (310) compensates for and maintains constant pressure of the flows returning from the heat exchangers of the first recovery group (100) and the second recovery group (200) operating at different temperatures and pressures in the first refrigeration cycle and second refrigeration cycle respectively, for delivering the cooling fluid (301) to the first compressor (330).

In addition, said first refrigeration cycle comprises a solenoid valve (380) connected in parallel to said fourth heat exchanger (320) and said first fluid connection (302) of the cooling group (300), wherein said solenoid valve (380) is controlled by said control means allowing or restricting the flow of a hot gas from the first compressor (330) to defrost the equipment when necessary. For instance, by means of a scheduled defrosting cyclic program or a continuous census of the conditions of the equipment.

Also, said second refrigeration cycle comprises a second solenoid valve (not shown) connected in parallel to said fourth heat exchanger (320) and said second fluid connection (303) of the cooling group (300), wherein said second solenoid valve is controlled by said control means allowing or restricting the flow of a hot gas from the first compressor (330) to defrost the equipment when necessary. For instance, by means of a scheduled defrosting cyclic program or a continuous census of the conditions of the equipment.

For example, said cooling fluid (301) may be Freon type R507a with a load of 11.3 kg; said pressure modulator (310) is mechanical or electronic; said first suction trap (311) with ⅞" connection; said fourth heat exchanger (320) is a plate exchanger; said first compressor (330) is hermetic and reciprocating, operated with a power of about 2.5 hp and with an appropriate frequency variator for varying its speed as a function of the suction pressure; said first liquid/oil separator (331) has ⅜" fluid connections; said first air-cooled condenser (340) is a 16 m$^2$ condenser with forced air, for an ambient temperature between 15° C. and 22° C., and a mono-phase fan between 2.5 and 6 hp; said first liquid accumulator (350) with ⅞" fluid connections and a capacity of up to 3.9 liters; said first dehydrating filter (360) prevents moisture or impurity in the circuit and, for example, has a capacity for ⅝" fluid connection with flare connections for easily and regularly changing; said first liquid visor (370) for inspection of the cooling fluid (301) of the circuit has a fluid connection of ⅝".

According to another preferred aspect of the present invention, said cooling group (300) comprises said fourth heat exchanger (320) connected, on one hand, to said first heat exchanger (120) of the first recovery group (100) and on the other hand, to said first suction trap (311).

Alternatively, said cooling group (300) comprises said fourth heat exchanger (320) connected, on the one hand, to said first condenser (110) of the first recovery group (100) and, on the other hand, to said first suction trap (311).

Preferably, said first suction trap (311) is connected to said first compressor (330) connected to said first liquid/oil separator (331) connected to said fourth heat exchanger (320) forming a first cooling loop wherein said first cooling fluid (301) from the first recovery group (100) withdraw heat from the cooling fluid (301) from the first liquid/oil separator (331).

Preferably, said fourth heat exchanger (320) is connected to said first air cooled condenser (340) connected to said first liquid accumulator (350) connected to said first dehydrating filter (360) connected to said first liquid visor (370) connected to said first fluid connection (302) forming said first cooling cycle of the cooling group (300) which withdraws heat from said first recovery group (100).

In addition, said cooling group (300) comprises a fifth heat exchanger (325) connected, on one hand, to said third heat exchanger (260) of the second recovery group (200) and, on the other hand, to a second suction trap (315).

Alternatively, said cooling group (300) comprises said fifth heat exchanger (325) connected, on the one hand, to said second condenser (210) of the second recovery group (200) and, on the other hand, to said second suction trap (315).

Preferably, said second suction trap (315) is connected to a second compressor (335) connected to a second liquid/oil separator (336) connected to said fifth heat exchanger (325) forming a second cooling loop wherein said cooling fluid (301) from the second recovery group (200) withdraws heat from the cooling fluid (301) from the second liquid/oil separator (336).

Preferably, said fifth heat exchanger (325) is connected to a second air cooled condenser (345) connected to a second liquid accumulator (355) connected to a second dehydrating filter (365) connected to a second liquid visor (375) connected to said second fluid connection (303) forming a second cooling cycle of the cooling group (300) which withdraws heat from said second recovery group (200).

Said first cooling cycle and said second cooling cycle of the cooling group (300) are individual.

For example, said refrigerant fluid (301) may be Freon type R507a with a load of 11.3 kg; said first and second suction traps (311, 315) have ⅞" connection; said fourth and fifth heat exchangers (320, 325) are plate exchangers; said first and second compressors (330, 335) are hermetic and reciprocating, operated with a power of about 2.5 hp and with an appropriate frequency variator for varying their speed as a function of the suction pressure; said first and second liquid/oil separators (331, 336) have ⅜" fluid connections; said first and second air-cooled condensers (340, 345) are 16 m² condensers with forced air for an ambient temperature between 15° C. and 22° C., and a mono-phase fan between 2.5 and 6 hp; said first and second liquid accumulators (350, 355) have ⅞" fluid connections and up to 3.9 liter capacity; said first and second dehydrating filters (360, 365) prevents moisture or impurity in the circuit and for example have a capacity for ⅝" fluid connection with flare connections for easily and regularly changing; said first and second liquid visors (370, 375) for inspection of refrigerant fluid (301) of the circuit have ⅝" fluid connection.

Said housing comprises displacement means such as for example mobile wheels.

In addition, the aroma recovery equipment of the present invention comprises at least one refrigeration manometer for monitoring pressures within the equipment, in the high and low pressure zones according to the pressures of the selected refrigerants, cooling and cascade refrigerants fluid, preferably four refrigeration manometers.

In addition, the aroma recovery equipment of the present invention comprises at least one adjustable pressure switch for high and low pressure of the equipment, preferably two adjustable pressure switches.

Additionally, the aroma recovery equipment of the present invention comprises through valves for closing the various cycles of the equipment, for example, ⅝" ball valves.

Preferably, it is understood that each electronic expansion valve includes a coil operative form performing the mechanical work of opening and closing said valve by its electronic activation.

Additionally, the aroma recovery equipment of the present invention comprises thermal insulation, aeroflex type, for coating the fluid connections and components through which the cooling, refrigerant and cascade refrigerant fluids flow (101, 201, 202, 301).

Preferably, the fluid connections of the aroma recovery equipment of the present invention are made of annealed copper pipes, in particular of ⅝", ⅞" and 1⅛" diameters, and non-toxic PVC hoses, for the first and second refrigerant fluids (101, 201) of ½", ⅜" and 1" diameter.

Preferably, the components of the equipment are welded together.

According to one aspect of the invention, said control means comprises, a first controller (410) configured to control the temperature of the first refrigerant fluid (101) of the first recovery group (100); a second controller (420) configured to control the temperature of the second refrigerant fluid (201) of the second recovery group (200); a third controller (430) configured to control the temperature of the cooling fluid (301) of the cooling group (300); a fourth controller (440) configured to control the temperature of the first refrigerant fluid (101). This fourth controller (440) prevents the second condenser (210) of aroma from lowering the temperature before the first condenser (110), by opening and closing the solenoid (307) of the first recovery group (100).

According to a preferred aspect of the invention, said controlmeans is configured in PLC and PID programmers incorporated in an electrical board, such that said first controller (410) varies the fan speed of the first air-cooled condenser (340) for varying the cooling capacity; said second controller (420) commands the passage of cooling fluid (301) through said second fluid connection means (303); said third controller (430) commands the passage of cooling fluid (301) through said first fluid connection means (302); said fourth controller (440) controls the passage of cooling fluid (301) by said second fluid connection means (303) according to the temperature recorded on the first condenser (110) to prevent the second condenser (210) from lowering its temperature before the first condenser (110) is at its working temperature, avoiding freezing problems in the equipment.

Additionally, the control means may comprise sensors operatively connected to monitor the temperatures of each fluid (101, 201, 202, 301).

The invention claimed is:

1. An aroma recovery equipment for recovering aromas from exhaust gases from fermentation vats, wherein the aroma recovery equipment comprises:
   a first recovery group comprising a first condenser, wherein the first condenser operates at a first outlet gas temperature and receives the exhaust gases from the fermentation vats, the first condenser condenses aromatic molecules generating the aromas into a liquid recovered by an aroma outlet for storing and then exhausts the exhaust gases by a gas outlet of the first recovery group;
   a second recovery group comprising a second condenser, wherein the second condenser operates at a second outlet gas temperature and receives the exhaust gases from the gas outlet of the first recovery group, the second condenser condenses the aromatic molecules into a liquid recovered by a second aroma outlet for storing and then exhausts the exhaust gases by a gas outlet of the second recovery group:
a cooling group to provide cold by a cooling fluid to said first recovery group via a first fluid connection means and to said second recovery group via a second fluid connection means;
control means configured to coordinately control a temperature of said first recovery group and a temperature of said second recovery group; and
a housing with displacement means.

2. The aroma recovery equipment according to claim 1, wherein said first outlet gas temperature of said first condenser is between 0° C and −15° C. and said second outlet gas temperature of said second condenser is between −40° C. and −60° C.

3. The aroma recovery equipment according to claim 1, wherein said first fluid connection means of the cooling group comprises a first expansion valve connected to said first condenser said first condenser being a flooded condenser that is cooled by expanding the cooling fluid upstream of said first condenser, wherein said first expansion valve is electronically controlled by said control means.

4. The aroma recovery equipment according to claim 1, wherein said first fluid connection means of the cooling group comprises a first control solenoid valve and a first expansion valve connected in series to said first condenser, said first condenser being a flooded condenser that is cooled by expanding the cooling fluid upstream of said first condenser, wherein said first control solenoid valve is controlled by said control means.

5. The aroma recovery equipment according to claim 1, wherein said first recovery group includes said first condenser connected to a first heat exchanger connected to a pump connected to a fluid tank connected to said first condenser.

6. The aroma recovery equipment according to claim 5, wherein said first fluid connection means of the cooling group comprises a first control solenoid valve and a first expansion valve connected in series to the first heat exchanger of the first recovery group, wherein the cooling fluid expands upstream of the first heat exchanger, removing heat from said first recovery group, wherein said first control solenoid valve is controlled by said control means.

7. The aroma recovery equipment according to claim 5, wherein said first fluid connection means of the cooling group comprises a first expansion valve connected to the first heat exchanger of the first recovery group, wherein the cooling fluid expands upstream of the first heat exchanger, removing heat from said first recovery group, wherein said first expansion valve is electronic and is controlled by said control means.

8. The aroma recovery equipment according to claim 1, wherein said second fluid connection means of the cooling group comprises a second expansion valve connected to said second condenser, the second condenser being a flooded condenser that is cooled by expanding the cooling fluid upstream of said second condenser, wherein said second expansion valve is electronically controlled by said control means (400).

9. The aroma recovery equipment according to claim 1, wherein said second fluid connection means of the cooling group comprises a second control solenoid valve and a second expansion valve connected in series to said second condenser the second condenser being a flooded condenser that is cooled by expanding the cooling fluid upstream of said second condenser, wherein said second control solenoid valve is electronic and controlled by said control means.

10. The aroma recovery equipment according to claim 1, wherein said second recovery group includes said second condenser connected to a second heat exchanger connected to a pump connected to a fluid tank connected to said second condenser.

11. The aroma recovery equipment according to claim 10, wherein said second recovery group further comprises a compressor and an expansion tank in parallel, connected on one side to the second heat exchanger and on the other side to a liquid/oil separator connected to a third heat exchanger connected to a liquid accumulator connected to a dehydrating filter connected to a liquid visor connected to a control solenoid valve connected to an expansion valve connected to said second heat exchanger forming a cascade refrigerant cycle.

12. The aroma recovery equipment according to claim 11, wherein said cascade refrigerant cycle also comprises a pressure relief valve connected in parallel to the compressor and the expansion tank so as to eliminate excess pressure by releasing the cascade refrigerant fluid to the expansion tank.

13. The aroma recovery equipment according to claim 11, wherein said second fluid connection means of the cooling group comprises a second control solenoid valve and a second expansion valve connected in series to the third heat exchanger of the second recovery group, wherein the cooling fluid expands upstream of the third heat exchanger, removing heat from the cascade refrigerant cycle of the second recovery group, wherein said second control solenoid valve is controlled by said control means.

14. The aroma recovery equipment according to claim 11, wherein said second fluid connection means of the cooling group comprises a second expansion valve connected to the third heat exchanger of the second recovery group, wherein the coolant fluid expands upstream of the third heat exchanger for removing heat from the cascade refrigerant cycle of the second recovery group, and wherein said second expansion valve is electronic and is controlled by said control means.

15. The aroma recovery equipment according to claim 11, wherein said cooling group comprises a pressure modulator connected by a first input to a first heat exchanger of the first recovery group and a second input to the third heat exchanger of the second recovery group.

16. The aroma recovery equipment according to claim 10, wherein said cooling group comprises a pressure modulator connected by a first input to a first heat exchanger of the first recovery group, and wherein said pressure modulator is connected by a second input to:
the second condenser of the second recovery group; or
the second heat exchanger of the second recovery group.

17. The aroma recovery equipment according to claim 16, wherein said pressure modulator is connected to a first suction trap connected to a fourth heat exchanger connected to a first compressor connected to a first liquid/oil separator connected to said fourth heat exchanger.

18. The aroma recovery equipment according to claim 17, wherein said fourth heat exchanger is connected to a first air-cooled condenser connected to a first liquid accumulator connected to a first dehydrating filter connected to a first liquid visor connected in a branched fashion, in a first branch, to said first fluid connection means forming a first cooling cycle of the cooling group and, in a second branch, to said second fluid connection means forming a second cooling cycle of the cooling group.

19. The aroma recovery equipment according to claim 18, wherein said first cooling cycle comprises a solenoid valve connected in parallel to said fourth heat exchanger and said first fluid connection means of the cooling group, wherein said solenoid valve is controlled by said control means to allow or restrict the flow of hot gas from the first compressor for deicing equipment.

20. The aroma recovery equipment according to claim 18, wherein said second cooling cycle comprises a second solenoid valve connected in parallel to said fourth heat exchanger and said second fluid connection means of the cooling group, wherein said second solenoid valve is controlled by said control means to allow or restrict the flow of hot gas from the first compressor for deicing equipment.

21. The aroma recovery equipment according to claim 17, wherein said fourth heat exchanger of the cooling group is connected on one hand, to said first condenser of the first recovery group and, on the other hand, to said first suction trap.

22. The aroma recovery equipment according to claim 17, wherein said fourth heat exchanger of the cooling group is connected, on one hand, to said first heat exchanger of the first recovery group and, on the other hand, to said first suction trap.

23. The aroma recovery equipment according to claim 17, wherein said first suction trap is connected to said first compressor connected to said first liquid/oil separator connected to said fourth heat exchanger.

24. The aroma recovery equipment according to claim 23, wherein said fourth heat exchanger is connected to a first air-cooled condenser connected to a first liquid accumulator connected to a first dehydrating filter connected to a first liquid visor connected to a first fluid connection means forming a first cooling cycle of the cooling group.

25. The aroma recovery equipment according to claim 17, wherein said cooling group comprises a fifth heat exchanger connected, on one hand, to said third heat exchanger of the second recovery group and, on the other hand, to a second suction trap.

26. The aroma recovery equipment according to claim 17, wherein said cooling group comprises a fifth heat exchanger connected, on one hand, to said second condenser of the second recovery group and, on the other hand, to a second suction trap.

27. The aroma recovery equipment according to claim 24, wherein a second suction trap (315) is connected to a second compressor connected to a second liquid/oil separator connected to a fifth heat exchanger forming a second cooling loop, and said fifth heat exchanger is connected to a second air-cooled condenser connected to a second liquid accumulator connected to a second dehydrating filter connected to a second liquid visor connected to said second fluid connection means forming a second cooling cycle of the cooling group.

28. The aroma recovery equipment according to claim 1 wherein said displacement means comprises wheels.

29. The aroma recovery equipment according to claim 1, wherein said control means comprise a first controller (410) configured to control a fluid temperature of a first cooling cycle; a second controller configured to control a fluid temperature of the second recovery group; a third controller configured to control a fluid temperature of the cooling group; and a fourth controller configured to control a fluid temperature of the first recovery group, wherein said control means are configured in PLC and PID programmers incorporated in an electrical panel.

30. The aroma recovery equipment according to claim 29, wherein said control means are configured such that said second controller controls a passage of the cooling fluid by said second fluid connection means; said third controller controls a passage of cooling fluid by said first fluid connection means; said fourth controller controls a passage of cooling fluid by said second fluid connection means according to a temperature sensed in the first condense to prevent the second condenser from lowering its temperature before that the first condenser is at a working temperature, avoiding freezing problems in the equipment.

31. The aroma recovery equipment according to claim 29, wherein a fourth heat exchanger is connected to a first air-cooled condenser connected to a first liquid accumulator connected to a first dehydrating filter connected to a first liquid visor connected in a branched fashion, in a first branch, to said first fluid connection means forming a first cooling cycle of the cooling group and, in a second branch, to said second fluid connection means forming a second cooling cycle of the cooling group, and wherein said control means are configured in PLC and PID programmers incorporated in an electrical panel, such that said first controller varies a fan speed of the first air-cooled condenser.

32. The aroma recovery equipment according to claim 29, wherein a fourth heat exchanger is connected to a first air-cooled condenser connected to a first liquid accumulator connected to a first dehydrating filter connected to a first liquid visor connected to a first fluid connection means forming a first cooling cycle of the cooling group, and wherein said control means are configured in PLC and PID programmers incorporated in an electrical panel, such that said first controller varies a fan speed of the first air-cooled condenser.

* * * * *